US009309393B2

(12) United States Patent
Bernreitner et al.

(10) Patent No.: US 9,309,393 B2
(45) Date of Patent: Apr. 12, 2016

(54) SOFT POLYPROPYLENE COMPOSITION WITH SOFT TOUCH FEELING

(75) Inventors: Klaus Bernreitner, Linz (AT); Tung Pham, Linz (AT); Espen Ommundsen, Langesund (NO); Pirjo Jääskeläinen, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 741 days.

(21) Appl. No.: 12/733,916

(22) PCT Filed: Oct. 1, 2008

(86) PCT No.: PCT/EP2008/063167
§ 371 (c)(1),
(2), (4) Date: Mar. 26, 2010

(87) PCT Pub. No.: WO2009/047188
PCT Pub. Date: Apr. 16, 2009

(65) Prior Publication Data
US 2010/0249326 A1 Sep. 30, 2010

(30) Foreign Application Priority Data
Oct. 11, 2007 (EP) .................... 07118320

(51) Int. Cl.
C08L 23/00 (2006.01)
C08L 23/10 (2006.01)
C08L 23/08 (2006.01)
C08L 23/16 (2006.01)
C08K 5/01 (2006.01)
C08K 5/14 (2006.01)

(52) U.S. Cl.
CPC .............. C08L 23/10 (2013.01); C08L 23/08 (2013.01); C08L 23/16 (2013.01); C08K 5/01 (2013.01); C08K 5/14 (2013.01); C08L 23/0869 (2013.01); C08L 2207/02 (2013.01); C08L 2308/00 (2013.01); C08L 2312/02 (2013.01)

(58) Field of Classification Search
CPC ......... C08L 23/10; C08L 23/16; C08L 23/08; C09L 23/10
USPC ........................................................ 525/240
See application file for complete search history.

(56) References Cited

U.S. PATENT DOCUMENTS

| 2,897,183 | A | | 7/1959 | Christl et al. |
| 3,350,372 | A | | 10/1967 | Anspon et al. |
| 3,756,996 | A | | 9/1973 | Pugh et al. |
| 4,775,722 | A | * | 10/1988 | Kobayashi et al. ........... 525/227 |
| 4,933,389 | A | * | 6/1990 | Hikasa et al. ................. 524/523 |
| 4,946,896 | A | | 8/1990 | Mitsuno et al. |
| 5,028,674 | A | | 7/1991 | Hatch et al. |
| 5,206,294 | A | | 4/1993 | Dawson |
| 5,532,066 | A | | 7/1996 | Latiolais et al. |
| 6,153,704 | A | * | 11/2000 | Kodama et al. ............... 525/240 |
| 7,629,404 | B2 | * | 12/2009 | Zucchelli et al. ............. 524/432 |
| 2011/0266027 | A1 | * | 11/2011 | Pham et al. ............... 174/113 R |

FOREIGN PATENT DOCUMENTS

| EP | 0491566 A2 | 6/1992 |
| EP | 0 922 729 | 6/1999 |
| EP | 0922729 A1 | 6/1999 |
| EP | 1 323 779 | 7/2003 |
| EP | 1323779 A1 | 7/2003 |
| EP | 1301343 B1 | 4/2004 |
| EP | 1452630 A1 | 9/2004 |
| EP | 1 544 245 | 6/2005 |
| EP | 1544245 A1 | 6/2005 |
| EP | 1 607 440 A1 | 12/2005 |
| EP | 1607440 * | 12/2005 |
| EP | 1 803 772 A1 | 7/2007 |
| EP | 1803772 * | 7/2007 |
| GB | 2 195 347 | 4/1988 |
| GB | 2195347 A | 4/1988 |
| WO | 0228957 A1 | 4/2002 |
| WO | WO 02/28957 | 4/2002 |
| WO | 02055599 A2 | 7/2002 |
| WO | WO 02/055599 | 7/2002 |
| WO | 03033542 A1 | 4/2003 |
| WO | WO 03/033542 | 4/2003 |

OTHER PUBLICATIONS

International Search Report for Application No. PCT/EP2008/063167 Filed on Apr. 12, 2008.
Richard T. Chou et al., "High Flexibility EMA made from High Pressure Tubular Process", Annual Technical Conference—Society of Plastics Engineers, 2002, 60th, vol. 2, pp. 1832-1836.
M. Sentmanat et al., "Measuring the Transient Extensional Rheology of Polyethylene Melts using the SER Universal Testing Platform", J. Rheol, 49s3d, pp. 585-606.
C-NMR; Literature: "IR-Spektroskopie fur Anwender"; WILEY-VCH, 1997 and "Validierung in der Analytik", WILEY-VCH, 1997.

* cited by examiner

Primary Examiner — Irina Krylova
(74) Attorney, Agent, or Firm — Warn Partners, P.C.

(57) ABSTRACT

Propylene polymer composition comprising a polypropylene (A), an elastomeric copolymer (B) of ethylene and at least one α-olefin comonomer selected form the group consisting of propylene, 1-butene, 1-pentene, 1-hexene, 1-heptene and 1-octene, and an ethylene C2 to C8 alkyl acrylate copolymer (C) wherein the composition has a strain hardening $SH_{3.0/2.5}$ (at a Hencky strain rate of 3 $s^{-1}$) of at least 0.5.

17 Claims, No Drawings

US 9,309,393 B2

SOFT POLYPROPYLENE COMPOSITION WITH SOFT TOUCH FEELING

This application is a National Stage of International Application No. PCT/EP2008/063167, filed Oct. 1, 2008. This application claims priority to European Patent Application No. EP 07118320.6 filed on Oct. 11, 2007. The disclosures of the above applications are incorporated herein by reference.

The present invention relates to a propylene composition with a soft touch feeling as well as to its manufacture and use and to articles made out of the new composition.

Polyvinyl chloride (PVC) is a widely used polymer inter alia because of its excellent properties. It has found various applications such as in wall paper, pipes, films, sheets, profiles, cables, flooring materials, roofing materials, tarpaulins, rainwear apparel, etc. For many applications a soft and flexible material is needed and to this end the PVC is plasticised with a plasticiser. There are concerns, however, in some cases about the use of plasticised PVC and an ambition to substitute it with other polymers. Polypropylene compositions could be such substitutes. However wherever very soft and flexible materials are desired polypropylene compositions have been up to now not able to replace the polyvinyl chloride counterparts successfully as very high soft products are in commercial scale ups not producible. It is for instance known that heterophasic polypropylene systems, i.e. systems obtained in a at least two step process resulting in a multiphase structure comprising a propylene matrix and inclusions therein comprising amorphous elastomer, can be tailored by setting the comonomer content in the matrix and in the elastomeric phase respectively for different purposes desired. For instance with increase of the comonomer content the softness of the polypropylene composition can be improved. However there are limits set by the processes employed for the manufacture of heterophasic polypropylene with regard to the comonomer content. For instance too high amounts of comonomer content in the first process step, i.e. in the first reactor, impede the transfer of the obtained matrix due to stickiness problems in the transfer lines. But not only the high comonomer content in the composition causes serious problems in the reactions vessels or transfer lines but also the final product suffers from its tacky behavior. Such tacky products will be not accepted by the customers due to unpleasant touch feeling.

Accordingly to date it is not possible to produce polypropylene compositions with high softness and being simultaneously not sticky. Thus there is a desire to provide a polypropylene composition having a soft touch feeling, i.e. being very soft and not sticky.

Thus the object of the present invention is to provide a polypropylene compositions being very soft, i.e. having preferably a tensile modulus of below 230 MPa. Even more preferred it is sought for a polypropylene composition having a soft touch feeling, i.e. being very soft and not sticky. Of course it is also appreciated that the polypropylene composition has additionally good impact properties and improved melt strength performance.

The finding of the present invention is that a propylene copolymer composition must be mixed with an ethylene alkyl-acrylate and afterwards chemically modified, preferably by at least bifunctionally unsaturated compounds.

Thus the present invention is directed in a first embodiment to a propylene polymer composition comprising
(a) a polypropylene (A)
(b) an elastomeric copolymer (B) of ethylene and at least one α-olefin comonomer selected form the group consisting of propylene, 1-butene, 1-pentene, 1-hexene, 1-heptene and 1-octene,
(c) an ethylene C2 to C8 alkyl acrylate copolymer (C) and
(d) units (D) derived from (at least) bifunctionally unsaturated monomer(s) (D') and/or (at least) multifunctionally unsaturated low molecular weight polymer(s) (D").

In a specific first embodiment the propylene polymer composition comprises
(a) a polypropylene (A),
(b) an elastomeric copolymer (B) of ethylene and at least one α-olefin comonomer selected form the group consisting of propylene, 1-butene, 1-pentene, 1-hexene, 1-heptene and 1-octene, and
(c) an ethylene C2 to C8 alkyl acrylate copolymer (C),
wherein the propylene polymer composition has a gel content of 0.25 to 1.00 wt.-% determined as the xylene hot insoluble fraction and the amount
(i) of the polypropylene (A) is at least 35.0 wt.-%, more preferably is at least 38 wt.-%, like is at least 40 wt.-%,
(ii) of the elastomeric copolymer (B) is not more than 50.0 wt.-%, more preferably is not more than 48 wt.-%, like is not more than 45 wt.-%, and
(iii) of the ethylene C2 to C8 alkyl acrylate copolymer (C) is at least 10.0 wt.-%, more preferably is at least 12.0 wt.-%, like is at least 14.0 wt.-%,
within the propylene polymer composition.

Preferably the units (D) are chemically bound bridging units, i.e. units linked to at least one of the polymers (A), (B) or (C). Even more preferred the bifunctionally unsaturated monomer(s) (D') and/or multifunctionally unsaturated low molecular weight polymer(s) (D") are linked to at least one of the polymers (A), (B) or (C) supported by thermally decomposing free radical-forming agents.

Alternatively the first embodiment of the present invention can be defined by a propylene polymer composition comprising
(a) a polypropylene (A)
(b) an elastomeric copolymer (B) of ethylene and at least one α-olefin comonomer selected form the group consisting of propylene, 1-butene, 1-pentene, 1-hexene, 1-heptene and 1-octene, and
(c) an ethylene C2 to C8 alkyl acrylate copolymer (C)
wherein said composition is chemically modified by (at least) bifunctionally unsaturated monomer(s) (D') and/or (at least) multifunctionally unsaturated low molecular weight polymer(s) (D").

In a preferred embodiment the composition is chemically modified by bifunctionally unsaturated monomer(s) (D') and/or multifunctionally unsaturated low molecular weight polymer(s) (D") only. Of course preferably supported preferably by thermally decomposing free radical-forming agents as defined for instance in the present invention.

Preferably the chemically modification is achieved by the reaction of the components (A), (B) and (C) with the bifunctionally unsaturated monomer(s) (D') and/or multifunctionally unsaturated low molecular weight polymer(s) (D") supported by thermally decomposing free radical-forming agents. More preferably (at least) the bifunctionally unsaturated monomer(s) (D') and/or (at least) the multifunctionally unsaturated low molecular weight polymer(s) (D") lead(s) to chemically bound bridging units, i.e. to units linked to at least one of the polymers (A), (B) or (C).

In a second embodiment the present invention is defined by a propylene polymer composition comprising
(a) a polypropylene (A)

(b) an elastomeric copolymer (B) of ethylene and at least one α-olefin comonomer selected form the group consisting of propylene, 1-butene, 1-pentene, 1-hexene, 1-heptene and 1-octene, and
(c) an ethylene C2 to C8 alkyl acrylate copolymer (C) wherein said composition has
(i) a gel content of at least or more than 0.25 wt.-% and/or
(ii) a strain hardening $SH_{3.0/2.5}$ (at a Hencky strain rate of 3 s$^{-1}$) of at least 0.5.

In a specific second embodiment the propylene polymer composition comprises
(a) a polypropylene (A),
(b) an elastomeric copolymer (B) of ethylene and at least one α-olefin comonomer selected form the group consisting of propylene, 1-butene, 1-pentene, 1-hexene, 1-heptene and 1-octene, and
(c) an ethylene C2 to C8 alkyl acrylate copolymer (C), wherein the propylene polymer composition
has a strain hardening $SH_{3.0/2.5}$ (at a Hencky strain rate of 3 s$^{-1}$) of at least 0.5,
has a gel content determined as the xylene hot insoluble fraction of equal or below 1.00 wt.-%, and
the amount
(i) of the polypropylene (A) is at least 35.0 wt.-%, more preferably is at least 38 wt.-%, like is at least 40 wt.-%,
(ii) of the elastomeric copolymer (B) is not more than 50.0 wt.-%, more preferably is not more than 48 wt.-%, like is not more than 45 wt.-%, and
(iii) of the ethylene C2 to C8 alkyl acrylate copolymer (C) is at least 10.0 wt.-%, more preferably is at least 12.0 wt.-%, like is at least 14.0 wt.-%,
within the propylene polymer composition.

Preferably the gel content and/or the strain hardening is achieved by a chemical modification of the propylene polymer composition. More preferably the propylene polymer composition comprises, in addition to the components (A), (B) and (C), units (D) derived from (at least) bifunctionally unsaturated monomer(s) (D') and/or (at least) multifunctionally unsaturated low molecular weight polymer(s) (D"). Said units (D) are preferably chemically bound bridging units, i.e. units linked to at least one of the polymers (A), (B) or (C). Even more preferred (at least) the bifunctionally unsaturated monomer(s) (D') and/or (at least) the multifunctionally unsaturated low molecular weight polymer(s) (D") are linked to at least one of the polymers (A), (B) or (C) supported by thermally decomposing free radical-forming agents.

Surprisingly it has been found out that the propylene polymer composition of both embodiments has superior properties compared with products known in the art (see table 1). For instance the propylene polymer composition has a very low tensile modulus. On the other hand the impact strength is significantly improved compared to an unmodified heterophasic polypropylene. Also the melt strength performance of the inventive propylene polymer composition is excellent. The positive effects, in particular the very low tensile modulus paired with a high impact strength (in particular at low temperatures) can be only accomplished in case the propylene polymer composition (based on polypropylene (A) and the elastomeric copolymer (B)) is modified by adding the ethylene C2 to C8 alkyl acrylate copolymer (C) and preferably afterwards by chemically modifying said composition by at least bifunctionally unsaturated compounds.

The further features mentioned below apply to both embodiments as defined above. To obtain especially good results the components may be present in specific amounts.

Thus it is preferred that the propylene polymer composition according to the instant invention comprises
(a) at least 35.0 wt.-%, like at least 40 wt.-%, preferably 35.0 to 60.0 wt.-%, i.e. 36.0 to 60 wt.-%, more preferably 40 to 60 wt.-%, like 40.0 to 55.0 wt.-%, and yet more preferably about 50.0 wt.-%, i.e. 48.0 to 52.0 wt.-%, of polypropylene (A)
(b) not more than 50.0 wt.-%, like not more than 48.0 wt.-%, i.e. 1.0 to 48.0 wt.-%, preferably 20.0 to 45.0 wt.-%, i.e. 20.0 to 44.0 wt.-%, more preferably 25.0 to 40.0 wt.-%, yet more preferably 30.0 to 35.0 wt.-%, of the elastomeric copolymer (B) and
(c) at least 10.0 wt.-%, like is at least 12.0 wt.-%, i.e. 1.0 to 12.0 wt.-%, preferably 10.0 to 30.0 wt.-%, i.e. 10 to 29 wt.-%, more preferably 14.0 to 26.0 wt.-%, yet more preferably 18.0 to 22.0 wt.-%, of ethylene C2 to C8 alkyl acrylate copolymer (C)
wherein the percentages are based on the total amount of the propylene polymer composition, preferably based on the total sum of all polymer components present in the propylene polymer composition, more preferably based on the sum of the polypropylene (A), the elastomeric copolymer (B) and the ethylene C2 to C8 alkyl acrylate copolymer (C).

It is especially preferred that the propylene polymer composition comprises only the polypropylene (A), the elastomeric copolymer (B) and the ethylene C2 to C8 alkyl acrylate copolymer (C) as polymer components.

In case the propylene polymer composition is modified, the modification is preferably accomplished by (at least) bifunctionally unsaturated monomer(s) (D') and/or (at least) multifunctionally unsaturated low molecular weight polymer(s) (D"). It is even more preferred that said monomer(s) (D') and/or polymer(s) (D") react to chemically bound bridging unit(s) (D), i.e. to units linked to at least one of the components (A), (B) and (C). A preferred amount of the bifunctionally unsaturated monomer(s) (D') and/or multifunctionally unsaturated low molecular weight polymer(s) (D") in the present propylene polymer composition is in the range of 0.1 to 10.0 wt.-%, more preferably in the range of 0.5 to 5.0 wt.-% based on the total amount of said composition, preferably based on the sum of the polypropylene (A), elastomeric copolymer (B), ethylene C2 to C8 alkyl acrylate copolymer (C) and bifunctionally unsaturated monomer(s) (D') and/or multifunctionally unsaturated low molecular weight polymer (s) (D").

The thermally decomposing free radical-forming agent, if used, is preferably in the range of 0.05 to 3.00 wt.-% based on the propylene polymer composition.

It is preferred that the polypropylene (A) and the elastomeric copolymer (B) are an intimate mixture. Thus the instant propylene polymer composition comprises
(a) an heterophasic propylene copolymer (E) comprising
  (i) the polypropylene (A) as a matrix
  (ii) the elastomeric copolymer (B) as an amorphous part dispersed in said matrix, and
(b) an ethylene C2 to C8 alkyl acrylate copolymer (C)
wherein the propylene polymer composition is modified and/or has a gel content of at least or more than 0.25 wt.-%, and/or a rather high strain hardening $SH_{3.0/2.5}$ (at a Hencky strain rate of 3 s$^{-1}$), i.e. of at least 0.5. Even more preferred said composition is modified due to unit (s) (D) derived from (at least) bifunctionally unsaturated monomer(s) (D') and/or (at least) multifunctionally unsaturated low molecular weight polymer(s) (D"). In particular said composition is modified due to chemically bound bridging unit(s) (D) derived from (at least)

bifunctionally unsaturated monomer(s) (D') and/or (at least) multifunctionally unsaturated low molecular weight polymer(s) (D") wherein said units (D) are preferably linked to at least one of the compounds (A) (B) and (C).

As stated above the modification can be supported by a thermally decomposing free radical-forming agent, preferably in the amount as given above.

The heterophasic propylene copolymer (E) is obtained by carrying out an at least two stage process resulting in a multiphase structure with a polypropylene matrix (A) and inclusions therein comprising the elastomeric copolymer (B) as a part of the amorphous phase. The exact method to produce such an heterophasic propylene copolymer (E) is defined in detail below.

In case the propylene polymer composition comprises such an heterophasic propylene copolymer (E) the inventive composition comprises preferably (a) at least 70.0 wt.-%, preferably 70.0 to 90.0 wt.-%, more preferably 74.0 to 86.0 wt.-%, yet more preferably 78.0 to 82.0 wt.-% of an heterophasic propylene copolymer based on the total amount of propylene polymer composition, preferably on the sum of the heterophasic propylene copolymer (E) and the ethylene C2 to C8 alkyl acrylate copolymer (C), comprising
  (i) at least 40.0 wt.-%, preferably 50.0 to 70.0 wt.-%, more preferably 55 to 65.0 wt.-%, yet more preferably 58.0 to 62.0 wt.-% of polypropylene (A) based on the total amount of the heterophasic propylene copolymer
  (ii) not more than 60.0 wt.-%, preferably 30.0 to 50.0 wt.-%, more preferably 35.0 to 45.0 wt.-%, yet more preferably 38.0 to 42.0 wt.-% of the elastomeric copolymer (B) based on the total amount of the heterophasic propylene copolymer (b) at least 10.0 wt.-%, preferably 10.0 to 30.0 wt.-%, more preferably 14.0 to 26.0 wt.-%, yet more preferably 18.0 to 22.0 wt.-% of ethylene C2 to C8 alkyl acrylate copolymer (C) based on the total amount of propylene polymer composition preferably on the sum of the heterophasic propylene copolymer and the ethylene C2 to C8 alkyl acrylate copolymer, and (c) optionally of 0.1 to 10.0 wt.-%, more preferably 0.1 to 5.0 wt.-%, still more preferably 0.1 to 3.0 wt.-%, bifunctionally unsaturated monomer(s) (D') and/or multifunctionally unsaturated low molecular weight polymer(s) (D") preferably as chemically bound bridging unit(s) (D) based on the total amount of the propylene polymer composition, preferably based on the total sum of all polymer components present in the propylene polymer composition, more preferably based on the sum of the polypropylene (A), elastomeric copolymer (B), ethylene C2 to C8 alkyl acrylate copolymer (C) and bifunctionally unsaturated monomer(s) (D') and/or multifunctionally unsaturated low molecular weight polymer(s) (D").

It is especially preferred that the propylene polymer composition comprises only the polypropylene (A), the elastomeric copolymer (B) and the ethylene C2 to C8 alkyl acrylate copolymer (C) as polymer components.

Thus in case units (D), i.e. bifunctionally unsaturated monomer(s) (D') and/or multifunctionally unsaturated low molecular weight polymer(s) (D"), are present in the propylene composition the amount of compounds (A), (B) and (C) together is preferably in the range of 90.0 to 99.9 wt.-%, more preferably is in the range of 95.0 to 99.1 wt.-%, still more preferably in the range of 97.0 to 99.1 wt.-% based on the total amount of the propylene polymer composition, preferably based on the sum of the polypropylene (A), elastomeric copolymer (B), ethylene C2 to C8 alkyl acrylate copolymer (C) and bifunctionally unsaturated monomer(s) (D') and/or multifunctionally unsaturated low molecular weight polymer(s) (D").

One mandatory requirement of the present invention is the presence of polypropylene (A) in the propylene polymer composition. The polypropylene (A) can be a propylene homopolymer, a propylene copolymer, i.e. a random propylene copolymer, or mixtures thereof.

However it is preferred that the polypropylene (A) is a propylene copolymer.

Where the polypropylene (A) comprises two or more different propylene polymers these may be polymers with different monomer make up and/or with different molecular weight distributions. These components may have identical or differing monomer compositions and tacticities.

The polypropylene (A), in particular in case the polypropylene (A) is the matrix of the heterophasic propylene copolymer (E), may be produced in a polymerization stage effected in one or more polymerization reactors. Desirably a polypropylene (A), in particular in case the polypropylene (A) is the matrix of the heterophasic propylene copolymer (E), comprising two or more different propylene polymers may be produced by carrying out polymerization in two or more different polymerisation reactors (e.g. bulk and/or gas phase reactors; as bulk reactors, loop reactors are preferred) whereby to generate polymers of the different desired molecular weight distributions or monomer make ups in the different polymerization reactors.

As stated above the polypropylene (A), in particular in case the polypropylene (A) is the matrix of the heterophasic propylene copolymer (E), is preferably a propylene homopolymer or propylene copolymer, i.e. random propylene copolymer, or a mixture thereof. Where it comprises a copolymer, the comonomers may include monomers copolymerizable with propylene, for example comonomers such as ethylene and C4 to C20 α-olefins, in particular ethylene and C4 to C10 α-olefins, e.g. 1-butene or 1-hexene. It is in particular preferred that the comonomer is ethylene. Preferably, where a copolymer component is present this will be a (relatively high molecular weight) random copolymer. The comonomer content is preferably relatively low, i.e. up to 8.0 wt.-%, more preferably 2.5 to 8.0 wt.-%, still more preferably 3.0 to 7.5 wt.-%, yet more preferably 4.0 to 7.0 wt.-%.

Preferably the polypropylene (A), in particular in case the polypropylene (A) is the matrix of the heterophasic propylene copolymer (E), is multimodal, preferably bimodal.

"Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

Such a multimodal, preferably bimodal, polypropylene (A), in particular the polypropylene (A) as the matrix of the heterophasic propylene copolymer (E), may comprise a propylene homopolymer and/or a propylene copolymer. Preferably the multimodal, more preferably bimodal, polypropylene (A), in particular as the matrix of the heterophasic propylene copolymer (E), comprise a propylene copolymer only.

It is in particular preferred that the polypropylene (A), in particular the polypropylene (A) as the matrix of the heterophasic propylene copolymer (E), is a bimodal propylene copolymer. Such a bimodal propylene copolymer has an ethylene content of up to 8.0 wt.-%, i.e. 1.0 to 8.0 wt.-%, more preferably 2.5 to 8.0 wt.-%, still more preferably 3.0 to 7.5 wt.-%, yet more preferably 4.0 to 7.0 wt.-%. Particularly the ethylene is the only comonomer in the bimodal propylene copolymer.

The production of polymers having the desired properties for polypropylene (A), in particular the polypropylene (A) as the matrix of the heterophasic propylene copolymer (E), may be achieved using techniques well known to those skilled in the art, e.g. by appropriate selection of catalyst systems (e.g. Ziegler Natta catalysts or metallocene or other single site catalysts), comonomers, polymerization reactor type and polymerization process conditions. Particularly the polypropylene (A), in particular the polypropylene (A) as the matrix of the heterophasic propylene copolymer (E), is produced in a polymerization process using a supported Ziegler Natta catalyst system (especially a high yield Ziegler Natta system containing Ti, Cl, Mg and Al). Metallocene catalysts may also be used.

Further and preferably the polypropylene (A), in particular the polypropylene (A) as the matrix of the heterophasic propylene copolymer (E), has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the polypropylene (A) has an $MFR_2$ (230° C.) in a range of 0.05 to 8.00 g/10 min, more preferably of 0.50 to 5.00 g/10 min, still more preferably of 1.00 to 3.00 g/10 min. The ranges given apply to a polypropylene (A) which is not modified due to the bifunctionally unsaturated compounds as defined in the instant invention.

The second requirement of both embodiments of the instant invention is the presence of the elastomeric copolymer (B) in the propylene polymer composition.

The elastomeric copolymer (B) comprises, preferably consists of, ethylene and at least one α-olefin comonomer selected form the group consisting of propylene, 1-butene, 1-pentene, 1-hexene, 1-heptene and 1-octene. Preferably the elastomeric copolymer (B) comprises at least ethylene and propylene and may comprise a further α-olefin as defined in this paragraph. However it is in particular preferred that propylene is the only comonomer. Thus an ethylene-propylene rubber (EPR) as elastomeric copolymer (B) is most preferred.

The comonomer content, preferably the propylene content, in the elastomeric copolymer (B) is desirably relatively high, i.e. at least 55.0 wt.-% and/or up to 85.0 wt.-%, preferably 60.0 to 85.0 wt.-%, more preferably 65.0 to 80.0 wt.-%. Preferably the elastomeric copolymer (B) is an ethylene-propylene rubber (EPR), in particular with a propylene content as defined in this paragraph.

Moreover the elastomeric copolymer (B) is preferably further specified by a rather low intrinsic viscosity determined as the intrinsic viscosity of the acetone precipitated fraction of the xylene soluble fraction, IV of AM, i.e. being not more than 4.0 dl/g. More preferably the intrinsic viscosity is in the range of 1.0 to 4.0 dl/g, still more preferred in the range of 1.5 to 3.0 dl/g.

As with the polypropylene (A), the elastomeric copolymer (B) may be produced by conventional gas phase α-olefin polymerization techniques; however it is preferably produced using a supported catalyst system, e.g. a Ziegler Natta catalyst system or a metallocene catalyst system.

As stated above the elastomeric copolymer (B) together with the polypropylene (A) form a heterophasic propylene copolymer (E). In such a case the elastomeric copolymer (B) may be blended with the polypropylene (A) as the matrix polymer. However, more desirably it is produced by performing a second and/or third polymerization stage in the presence of particles of polypropylene (A), e.g. as a second and/or third polymerization stage of a multistage polymerization. Preferably the combination of the polypropylene (A) and elastomeric copolymer (B) is produced in a three stage polymerization using three or more polymerization reactors, more preferably using bulk and gas phase reactors (especially fluidized bed gas phase reactors) especially preferably using a loop reactor followed by two gas phase reactors or by a loop and a gas phase reactor. In such a procedure, the catalyst system used may be varied between stages but is preferably the same for all stages. Especially preferably a prepolymerized heterogeneous (i.e. supported) catalyst is used.

While the catalyst may be a metallocene, it is preferred to use Ziegler Natta catalysts, e.g. an inorganic halide (e.g. $MgCl_2$) supported titanium catalyst, together with an aluminum alkyl (e.g. triethylaluminium) cocatalyst. Silanes, e.g. dicyclopentanedimethoxysilane (DCPDMS) or cyclohexylmethyldimethoxysilane (CHMDMS), may be used as external donors. Such catalyst systems are described in EP 0 491 566 A1, the contents whereof are hereby incorporated by reference.

In the following the inventive propylene polymer composition according to the first and second embodiment is further specified by the combination of the polypropylene (A) and the elastomeric copolymer (B). This applies in particular for the cases in which the polypropylene (A) and the elastomeric copolymer (B) form an heterophasic propylene copolymer (E).

Accordingly it is preferred that the mixture of the polypropylene (A) and the elastomeric copolymer (B), i.e. the heterophasic propylene copolymer (E), has a comonomer content, preferably ethylene content, more than 7.0 wt.-%, more preferably of more than 10.0 wt.-%, yet more preferably more than 12.0 wt.-%. As comonomers in this paragraph are understood (a) for the polypropylene (A) comonomer(s) selected from the group consisting of ethylene and C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof, preferably ethylene, and (b) for the elastomeric copolymer (B) comonomer(s) selected from the group consisting of propylene, 1-butene, 1-pentene, 1-hexene, 1-heptene, 1-octene and mixtures thereof, preferably the comonomer is propylene.

Moreover it is appreciated that the MFR$_2$ (230° C.) of the mixture of the polypropylene (A) and the elastomeric copolymer (B), i.e. the heterophasic propylene copolymer (E), is in a range of 0.05 to 4.00 g/10 min, more preferably of 0.30 to 2.00 g/10 min, still more preferably of 0.40 to 1.00 g/10 min. The ranges given apply to a non-modified state due to the bifunctionally unsaturated compounds as defined in the instant invention.

As a further component the present invention requires a further elastomeric substance which can be preferably intimately dispersed within the polypropylene (A) or within the heterophasic propylene copolymer (E). Such an elastomeric substance is the ethylene C2 to C8 alkyl acrylate copolymer (C). Preferably the C2 to C8 alkyl of the ethylene C2 to C8 alkyl acrylate copolymer (C) is selected from the group consisting of methyl, ethyl, and butyl. In a particular preferred embodiment the ethylene C2 to C8 alkyl acrylate copolymer (C) is ethylene butyl-acrylate (EBA).

Moreover it is appreciated that the alkyl acrylate content in the ethylene C2 to C8 alkyl acrylate copolymer (C) is rather high, i.e. is at least 10.0 wt.-%. Thus it is preferred that the alkyl acrylate content in the ethylene C2 to C8 alkyl acrylate copolymer (C) ranges from 10.0 to 45.0 wt.-%, more preferably ranges from 20.0 to 35.0 wt.-%.

Moreover it is appreciated that the ethylene C2 to C8 alkyl acrylate copolymer (C) has a MFR$_2$ (190° C.) in a range of 0.05 to 8.00 g/10 min, more preferably of 0.30 to 4.00 g/10 min, still more preferably of 0.50 to 2.00 g/10 min. The ranges given apply to a non-modified state due to the bifunctionally unsaturated compounds as defined in the instant invention.

The propylene polymer composition being not modified due to the bifunctionally unsaturated compounds as defined in the instant invention has preferably a MFR$_2$ (230° C.) in a range of 0.05 to 4.00 g/10 min, more preferably of 0.30 to 2.50 g/10 min, still more preferably of 0.40 to 1.00 g/10 min.

Finally the present invention requires that the inventive propylene polymer composition is modified, i.e. chemically modified. Such a modification is necessary to achieve for the inventive propylene polymer composition a specific gel content, i.e. of at least or more than 0.25 wt.-%, or a rather high strain hardening value, i.e. a strain hardening $SH_{3.0/2.5}$ (at a Hencky strain rate of 3 s$^{-1}$) of at least 0.5. As the modification has a strong influence on the gel content and/or the strain hardening behavior it is justified to define the present invention by the bifunctionally unsaturated compounds as defined herein (first embodiment) and/or by the gel content and the strain hardening $SH_{3.0/2.5}$ (at a Hencky strain rate of 3 s$^{-1}$), respectively, (second embodiment). Thus—as stated above—the inventive propylene polymer composition is inter alia defined in one embodiment by the presence of bifunctionally unsaturated compounds and in the other embodiment by gel content and/or the strain hardening $SH_{3.0/2.5}$. Of course the features "gel content" and "strain hardening" are also preferred features for the propylene polymer composition according to the first embodiment whereas the feature "chemical modification due to the bifunctionally unsaturated compounds" is also a preferred one for the propylene polymer composition according to the second embodiment (defined by the gel content and/or the strain hardening).

Without be bonded on this theory the modification may a chemical linking between the polymer components, as for instance between the components (A) and (B) and/or between the components (A) and (C) and/or between the components (B) and (C) (so called phase coupling). The modification may also be caused by a chemical linking within the elastomeric copolymer (B) and/or within the ethylene C2 to C8 alkyl acrylate copolymer (C) (so called elastomer cross-linking). Of course also the polypropylene (A) can be effected by similar modifications. A suitable chemical modification may be obtained for instance when using thermally decomposing free radical-forming agents without any bifunctionally unsaturated compounds. However in such a case a high risk exists that the polypropylene (A) is degraded, which is detrimental. Thus it is preferred that the modification is accomplished by the use of bifunctionally unsaturated monomer(s) (D') and/or multifunctionally unsaturated low molecular weight polymer(s) (D") as chemically bound bridging unit(s) (D).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerised preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (A) and/or the elastomeric copolymers, i.e. the elastomeric copolymer (B) and the ethylene C2 to C8 alkyl acrylate copolymer (C).

Reaction of the bifunctionally unsaturated monomer(s) (D') and/or multifunctionally unsaturated low molecular weight polymer(s) (D"), preferably having a number average molecular weight ($M_n$)≤10000 g/mol, synthesised from one and/or more unsaturated monomers with the propylene polymer composition may be performed in the presence of a thermally free radical forming agent, e.g. decomposing free radical-forming agent, like a thermally decomposable peroxide and/or ionising radiation or microwave radiation.

The bifunctionally unsaturated monomers may be
  divinyl compounds, such as divinylaniline, m-divinylbenzene, p-divinylbenzene, divinylpentane and divinylpropane;
  allyl compounds, such as allyl acrylate, allyl methacrylate, allyl methyl maleate and allyl vinyl ether;
  dienes, such as 1,3-butadiene, chloroprene, cyclohexadiene, cyclopentadiene, 2,3-dimethylbutadiene, heptadiene, hexadiene, isoprene and 1,4-pentadiene;
  aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight ($M_n$)≤10000 g/mol may be synthesized from one or more unsaturated monomers.
  Examples of such low molecular weight polymers are
  polybutadienes, especially where the different microstructures in the polymer chain, i.e. 1,4-cis, 1,4-trans and 1,2-(vinyl) are predominantly in the 1,2-(vinyl) configuration
  copolymers of butadiene and styrene having 1,2-(vinyl) in the polymer chain.

Preferred low molecular weight polymer is polybutadiene, in particular a polybutadiene having more than 50.0 wt.-% of the butadiene in the 1,2-(vinyl) configuration.

In the propylene polymer composition of the invention the chemically bound bifunctionally unsaturated monomer(s) (D') and/or multifunctionally unsaturated low molecular weight polymer(s) (D") may act as coupling agent between the polypropylene (A) and the elastomeric copolymers, i.e. the elastomeric copolymer (B) and the ethylene C2 to C8 alkyl acrylate copolymer (C), of the disperse phase or, and more preferably, within the elastomeric copolymer (B) and/or within the ethylene C2 to C8 alkyl acrylate copolymer (C). It is believed that those molecules, which—with one of their functionalities—are bound to a polymer molecule of the polypropylene (A) and—with their second or one of their further functionalities—are bound to a polymer molecule belonging to the disperse phase, effect the coupling action. Alternatively and preferably the bifunctionally or multifunctionally unsaturated compounds bound with one of their functionalities—to a polymer molecule of the elastomeric copolymers, i.e. the elastomeric copolymer (B) and/or the ethylene C2 to C8 alkyl acrylate copolymer (C), and—with their second or one of their further functionalities—bound to another polymer molecule belonging also to the elastomeric copolymers. It might of course also possible that the bifunctionally or multifunctionally unsaturated compounds modify in a similar manner polypropylene (A).

The polypropylene composition may contain more than one bifunctionally unsaturated monomer and/or multifunctionally unsaturated low molecular weight polymer.

As stated above it is preferred that the bifunctionally unsaturated monomer(s) (D') and/or multifunctionally unsaturated low molecular weight polymer(s) (D") are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide. Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Or mixtures of these above listed free radical-forming agents.

As further characteristic of the inventive propylene polymer is its rather good extensional melt flow properties.

The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as branching or linking, and as such can be far more descriptive with regard to polymer characterization than other types of bulk rheological measurement which apply shear flow.

Thus the inventive propylene polymer can be alternatively or additionally to the bifunctionally unsaturated compounds further defined by its strain hardening behavior.

Accordingly it is preferred that the inventive propylene polymer, in particular due to the chemical modification, i.e. due to the use of bifunctionally unsaturated and/or multifunctionally unsaturated compounds, has a rather high strain hardening $SH_{3.0/2.5}$ (at a Hencky strain rate of 3 $s^{-1}$) of at least 0.5, more preferably of at least 0.7, yet more preferably of at least 0.8 and still more preferably of at least 0.9. The exact measuring method is defined in the example section.

Moreover, the inventive propylene composition shall preferably further featured by a rather a low melt flow rate (MFR). Thus it is appreciated that the propylene polymer composition according to this invention has a $MFR_2$ (230° C.) of not more than 5.00 g/10 min, preferably in a range of 0.05 to 4.00 g/10 min, more preferably of 0.30 to 2.00 g/10 min, still more preferably of 0.40 to 1.80 g/10 min.

Preferably as stated above the propylene polymer composition is further and/or alternatively defined by the gel content. The gel content is a good indicator for the chemical modification of the inventive propylene polymer composition. Accordingly the present invention is featured by relatively high gel content, i.e. of at least or more than 0.25 wt.-%, more preferably of at least 0.27 wt.-%. On the other hand the gel content shall be not too high otherwise other properties are negatively influenced. Thus the gel content is preferably below or not more than 1.00 wt.-%, even more preferred not more than 0.80 wt.-%, still more preferred does not exceed 0.50 wt.-% determined as the relative amount of polymer insoluble in boiling xylene (xylene hot insoluble fraction, XHI). Thus a preferred range for the gel content is 0.25 to 0.90 wt.-%, more preferred 0.26 to 0.8 wt.-%.

Moreover the propylene polymer composition of the instant invention has preferably a tensile modulus measured according to ISO 527-3 (cross head speed=50 mm/min) of below 230 MPa, more preferably below 200 MPa and still more preferably below 180 MPa. Additionally it is preferred that the propylene polymer composition of the present invention has a rather high impact strength. Accordingly the inventive polymer composition has an impact strength measured according to the Charpy impact test according to ISO 179 (1 eA) at 23° C. of at least 40.0 kJ/m$^2$, more preferably of at least 50.0 kJ/m$^2$, yet more preferably of at least 60.0 kJ/m$^2$, and/or impact strength measured according to the Charpy impact test according to ISO 179 (1 eA) at −20° C. of at least 70.0 kJ/m$^2$, more preferably of at least 80.0 kJ/m$^2$.

In the following the manufacture of the inventive propylene polymer composition is described.

In general, the process for the manufacture of the inventive propylene polymer composition comprises the steps of
(a) mixing the polypropylene (A), the elastomeric copolymer (B) and the ethylene C2 to C8 alkyl acrylate copolymer (C), and
(b) modifying said mixture, preferably by adding bifunctionally unsaturated and/or multifunctionally unsaturated compounds, preferably as defined in the instant invention, to said mixture, and
(c) extruding said mixture.

Accordingly, the polymer composition in accordance with the present invention may be prepared by compounding the components within suitable melt mixing devices for preparing polymeric compounds, including in particular extruders single screw extruders as well as twin screw extruders. Especially preferred are twin screw extruders including high intensity mixing and kneading sections. Suitable melt temperatures for preparing the compositions are in the range from 170 to 270° C., preferably in the range from 200 to 250° C.

Preferably the polypropylene (A) and the elastomeric copolymer (B) are first produced to a so called heterophasic propylene copolymer (E).

In such a case the inventive propylene polymer composition is produced by the following steps:
(a) polymerizing propylene and optionally further comonomer(s) as defined above, preferably ethylene, in at least one reactor, preferably in one or more bulk reactor(s), preferably loop reactor, and/or in one or more gas phase reactor (s), wherein the reactors are typically connected in series, to obtain the polypropylene (A),
(b) transferring said polypropylene (A) in a further reactor, preferably a gas phase reactor,
(c) producing the elastomeric copolymer (B) by polymerizing propylene and further comonomer(s) as defined above, preferably ethylene, in the presence of said polypropylene (A) to obtain the elastomeric copolymer (B) dispersed in said polypropylene (A), i.e. leading to an heterophasic mixture
(d) mixing said heterophasic mixture with the ethylene C2 to C8 alkyl acrylate copolymer (C)
(e) modifying the mixture of step (d), preferably due to bifunctionally unsaturated monomer(s) and/or multifunctionally unsaturated low molecular weight polymer (s), optionally supported by thermally decomposing free radical-forming agents and
(f) extruding said mixture.

All reactors of steps (a) to (c) are preferably connected in series. The steps (d) and (e) are carried out in the mixing devices and temperature ranges as defined above.

The polymerisation is typically carried out in the presence of a Ziegler-Natta-type catalyst, as indicated above.

Thus, the Ziegler-Natta type catalyst typically used in the present invention is a propylene stereospecific, high yield Ziegler-Natta catalyst. Accordingly, a Ziegler Natta catalyst, e.g. an inorganic halide (e.g. $MgCl_2$) supported titanium catalyst, together with an aluminum alkyl (e.g. triethylaluminium) cocatalyst is employed. Silanes, e.g. dicyclopentanedimethoxysilane (DCPDMS) or cyclohexylmethyldimethoxysilane (CHMDMS), may be used as external donors. Such catalyst systems are described in EP 0 491 566 A1, the contents thereof are hereby incorporated by reference. The catalyst in the second polymerisation stage is typically the same that is used in the first polymerisation stage.

According to a preferred embodiment, the heterophasic propylene copolymer (E) is produced in a reactor system comprising at least one bulk reaction zone including at least one bulk reactor and at least one gas phase reaction zone including at least one gas phase reactor. The polymerization of polypropylene (A), i.e. the matrix of the heterophasic propylene copolymer (E), is preferably carried out in a loop reactor and in at least one gas phase reactor, i.e. in one or two gas phase reactor(s).

Hydrogen can be used in different amounts as a molar mass modifier or regulator in any or every reactor in the first (polymerization of polypropylene A) and second polymerization stage (polymerization of elastomeric copolymer (B)).

A separation stage can be employed between the reaction zones to prevent the carryover of reactants from the first polymerization stage into the second one.

In addition to the actual polymerization reactors used, the polymerization reaction system can also include a number of additional reactors, such as pre-reactors. The pre-reactors include any reactor for pre-activating and/or pre-polymerizing the catalyst with propylene and/or other α-olefin(s), like ethylene, if necessary. All reactors in the reactor system are preferably arranged in series.

The ethylene C2 to C8 alkyl acrylate copolymer (C) can be prepared by processes well known in the polymer art using either autoclave or tubular reactors.

The copolymerization can be run as a continuous process in an autoclave. For example, ethylene, an C2 to C8 alkyl acrylate such as methyl acrylate, and optionally a solvent such as methanol (see U.S. Pat. No. 5,028,674) are fed continuously into a stirred autoclave of the type disclosed in U.S. Pat. No. 2,897,183, together with an initiator. The reaction mixture may be continuously removed from the autoclave. After the reaction mixture leaves the reaction vessel, the copolymer may be separated from the unreacted monomers and solvent (if solvent was used) by conventional means, e.g., vaporizing the non-polymerized materials and solvent under reduced pressure and at an elevated temperature. Autoclave acrylate copolymers are for instance available from Voridian under the name EMAC™, from ExxonMobil under the name Optema™, and from Atofina under the name of Lotryl™.

Tubular reactor-produced ethylene C2 to C8 alkyl acrylate copolymer (C) can be distinguished from the more conventional autoclave produced ethylene C2 to C8 alkyl acrylate copolymer (C) as generally known in the art. Thus the term or phrase "tubular reactor produced" ethylene C2 to C8 alkyl acrylate copolymer (C) denotes an ethylene copolymer produced at high pressure and elevated temperature in a tubular reactor or the like. Tubular reactor produced ethylene C2 to C8 alkyl acrylate copolymers (C) of this nature are commercially available from E. I. du Pont de Nemours and Company, Wilmington, Del. (DuPont). The manufacturing of the tubular reactor ethylene C2 to C8 alkyl acrylate copolymers (C) is well known to one skilled in the art such as disclosed in U.S. Pat. No. 3,350,372, U.S. Pat. No. 3,756,996 and U.S. Pat. No. 5,532,066. For additional discussion regarding the differences between tubular reactor produced and autoclave produced ethylene C2 to C8 alkyl acrylate copolymers (C), see Richard T. Chou, Mimi Y. Keating and Lester J. Hughes, "High Flexibility EMA made from High Pressure Tubular Process", Annual Technical Conference—Society of Plastics Engineers (2002), 60th (Vol. 2), 1832-1836.

The modification can be for instance effected by dosing the polymer components separately into a twin screw extruder like Prism TSE24 40D with preferably a temperature profile 80/200/210/220/220/230/220/225/220° C. and a screw speed of 300 rpm. After heating and melting of the polymer mixture, a solution of the thermally decomposing free radical-forming agent, like tert-butylperoxy isopropyl carbonate, preferably in acetone (10.0 wt.-%) is injected directly into the extruder, achieving a concentration of 0.1 to 3.0 wt.-% of the thermally decomposing free radical-forming agent, based on the mixture. Through a second injection port, the bifunctionally monomer(s) (D') and/or multifunctionally unsaturated low molecular weight polymer(s) (D"), like butadiene, is injected into the same zone of the extruder as the thermally decomposing free radical-forming agent has been added. The polymer melt/liquid/gas mixture is passed through the extruder, then to intensive devolatilisation, discharged and pelletised.

Usual amounts of auxiliary substances, which may range from 0.01 to 2.5% by weight of stabilizers, 0.01 to 1% by weight of processing aids, 0.1 to 1% by weight of antistats, 0.2 to 3% by weight of pigments and up to 3% by weight of α-nucleating agents, in each case based on the sum of the propylene polymers, may be added.

The invention is also directed to the use of the inventive propylene polymer composition. Accordingly the present invention is directed to the use of the propylene polymer composition as defined in the instant invention for films, injection molded articles and flexible pipes, like soft grip parts for instance for a toothbrush. Thus the present invention is in particular directed to the use of the polymer composition of the instant invention as part of a film, injection molded article and flexible pipe.

Furthermore the present invention is directed to articles comprising the propylene polymer composition of the instant invention. Accordingly the present invention is in particular directed to a film, injection molded article, like a soft grip part, and flexible pipe comprising the propylene polymer composition as defined above in the present invention.

Considering the detailed information in this description, the following embodiments are especially preferred:

[001] Propylene polymer composition comprising
(a) a polypropylene (A)
(b) an elastomeric copolymer (B) of ethylene and at least one α-olefin comonomer selected form the group consisting of propylene, 1-butene, 1-pentene, 1-hexene, 1-heptene and 1-octene, and
(d) an ethylene C2 to C8 alkyl acrylate copolymer (C) wherein the propylene polymer composition has a gel content of at least or more than 0.25 wt.-%.

[002] Propylene polymer composition according to paragraph [001], wherein said composition has a strain hardening $SH_{3.0/2.5}$ (at a Hencky strain rate of 3 $s^{-1}$) of at least 0.5.

[003] Propylene polymer composition comprising
(a) a polypropylene (A),
(b) an elastomeric copolymer (B) of ethylene and at least one α-olefin comonomer selected form the group consisting of propylene, 1-butene, 1-pentene, 1-hexene, 1-heptene and 1-octene, and
(c) an ethylene C2 to C8 alkyl acrylate copolymer (C) wherein the propylene polymer composition has a strain hardening $SH_{3.0/2.5}$ (at a Hencky strain rate of 3 $s^{-1}$) of at least 0.5.

[004] Propylene polymer composition according to paragraph [003], wherein said composition has a gel content of at least or more than 0.25 wt.-%.

[005] Propylene polymer composition according to any one of the preceding claims, wherein said composition comprises additionally units (D) derived from at least bifunctionally unsaturated monomer(s) (D') and/or at least multifunctionally unsaturated low molecular weight polymer(s) (D").

[006] Propylene polymer composition comprising (a) a polypropylene (A)
(b) an elastomeric copolymer (B) of ethylene and at least one α-olefin comonomer selected form the group consisting of propylene, 1-butene, 1-pentene, 1-hexene, 1-heptene and 1-octene, and
(c) an ethylene C2 to C8 alkyl acrylate copolymer (C), and
(d) units (D) derived from at least bifunctionally unsaturated monomer(s) (D') and/or at least multifunctionally unsaturated low molecular weight polymer(s) (D").

[007] Propylene polymer composition according to paragraph [006], wherein said composition has
(a) a gel content of at least or more than 0.25 wt.-% and/or
(b) a strain hardening $SH_{3.0/2.5}$ (at a Hencky strain rate of 3 $s^{-1}$) of at least 0.5.

[008] Propylene polymer composition according to any one of the preceding paragraphs [001] to [007], wherein the gel content of said composition is equal or below 1.00 wt.-%.

[009] Propylene polymer composition according to any one of the preceding paragraphs [001] to [008], wherein the polypropylene (A) is the matrix of an heterophasic propylene copolymer (E) and the elastomeric copolymer (B) is an amorphous part of said heterophasic propylene copolymer (E).

[010] Propylene polymer composition according to any one of the preceding paragraphs [001] to [009], wherein the composition comprises
(a) at least 35.0 wt.-% of polypropylene (A),
(b) not more than 50.0 wt.-% of the elastomeric copolymer (B), and
(c) at least 10.0 wt.-% of ethylene C2 to C8 alkyl acrylate copolymer (C)
wherein the percentages are based on the total amount of the propylene polymer composition.

[011] Propylene polymer composition according to any one of the preceding paragraphs [001] to [010], wherein the composition comprises
(a) at least 70.0 wt.-% of an heterophasic propylene copolymer based on the total amount of propylene polymer composition comprising
 (i) at least 40.0 wt.-% of polypropylene (A) based on the total amount of the heterophasic propylene copolymer
 (ii) not more than 60.0 wt.-% of the elastomeric copolymer (B) based on the total amount of the heterophasic propylene copolymer
(b) at least 10.0 wt.-% of ethylene C2 to C8 alkyl acrylate copolymer (C) based on the total amount of propylene polymer composition.

[012] Propylene polymer composition according to any one of the preceding paragraphs [001] to [011], wherein the composition comprises not more than 10.0 wt.-% of units (D) based on the total amount of the propylene polymer composition.

[013] Propylene polymer composition according to any one of the preceding paragraphs [001] to [012], wherein
(a) the polypropylene (A) is a propylene copolymer and
(b) the comonomer is selected from the group consisting of ethylene and C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof.

[014] Propylene polymer composition according to paragraph [013], wherein the comonomer of the propylene copolymer is ethylene.

[015] Propylene polymer composition according to paragraph [013] or [014], wherein the comonomer content of the polypropylene (A) is not more than 8.0 wt.-%.

[016] Propylene polymer composition according to any one of the preceding paragraphs [001] to [015], wherein the polypropylene (A) is bimodal.

[017] Propylene polymer composition according to paragraph [016], wherein at least one of the two fractions of the bimodal polypropylene (A) is a propylene copolymer.

[018] Propylene polymer composition according to any one of the preceding paragraphs [001] to [017], wherein the elastomeric copolymer (B) is a ethylene propylene rubber (EPR).

[019] Propylene polymer composition according to any one of the preceding paragraphs [001] to [018], wherein
  (a) the comonomer content of the elastomeric copolymer (B) is at least 55.0 wt.-% and
  (b) the comonomer is selected from the group consisting of propylene, 1-butene, 1-pentene, 1-hexene, 1-heptene, 1-octene and mixtures thereof, preferably the comonomer is propylene.

[020] Propylene polymer composition according to any one of the preceding paragraphs [001] to [019], wherein the intrinsic viscosity of the elastomeric copolymer (B), determined as the intrinsic viscosity of the acetone precipitated fraction of the xylene soluble fraction, IV of AM, is in the range of 1.0 to 4.0 dl/g.

[021] Propylene polymer composition according to any one of the preceding paragraphs [001] to [020], wherein
  (a) the comonomer content of the polypropylene (A) and the elastomeric copolymer (B) together is more than 9.0 wt.-%,
  (b) the comonomer of the polypropylene (A) is selected from the group consisting of ethylene and C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof, preferably the comonomer is ethylene, and
  (c) the comonomer of the elastomeric copolymer (B) is selected from the group consisting of propylene, 1-butene, 1-pentene, 1-hexene, 1-heptene, 1-octene and mixtures thereof, preferably the comonomer is propylene.

[022] Propylene polymer composition according to any one of the preceding paragraphs [001] to [021], wherein the C2 to C8 alkyl of the ethylene C2 to C8 alkyl acrylate copolymer (C) is selected from the group consisting of methyl, ethyl, and butyl.

[023] Propylene polymer composition according to any one of the preceding paragraphs [001] to [022], wherein the ethylene C2 to C8 alkyl acrylate copolymer (C) is ethylene butyl-acrylate (EBA).

[024] Propylene polymer composition according to any one of the preceding paragraphs [001] to [023], wherein the alkyl acrylate content in the ethylene C2 to C8 alkyl acrylate copolymer (C) is at least 10.0 wt.-%.

[025] Propylene polymer composition according to any one of the preceding paragraphs [001] to [024], wherein the bifunctionally unsaturated monomers used for the units (D) are selected from the group consisting of divinyl compounds, allyl compounds and dienes.

[026] Propylene polymer composition according to any one of the preceding paragraphs [001] to [025], wherein the composition has $MFR_2$ (230° C.) measured according to ISO 1133 of not more than 5.00 g/10 min.

[027] Process for the manufacture of a propylene polymer composition according to any one of the preceding paragraphs [001] to [026] comprising the steps (a) mixing the polypropylene (A), the elastomeric copolymer (B) and the ethylene C2 to C8 alkyl acrylate copolymer (C),
  (b) adding bifunctionally unsaturated and/or multifunctionally unsaturated compounds, and
  (c) extruding said mixture.

[028] Process according to paragraph [027], wherein first an heterophasic mixture of polypropylene (A) and elastomeric copolymer (B) is produced by comprising the steps
  (a) polymerizing propylene and optionally further comonomer(s) in at least one reactor, preferably a loop reactor followed by a gas phase reactor, to obtain the polypropylene (A),
  (b) transferring said polypropylene (A) in a further reactor, preferably a gas phase reactor,
  (c) producing elastomeric copolymer (B) by polymerizing propylene and further comonomer(s) in the presence said polypropylene (A) to obtain the heterophasic mixture,
  (d) mixing said heterophasic mixture with the ethylene C2 to C8 alkyl acrylate copolymer (C),
  (e) adding bifunctionally unsaturated and/or multifunctionally unsaturated compounds, and
  (f) extruding the mixture.

[029] Process according to paragraph [027] or [028], wherein step (e) is carried out by using at least bifunctionally unsaturated monomer(s) and a thermally decomposing free radical-forming agent.

[030] Use of the propylene polymer composition according to any one of the preceding paragraphs [001] to [026] for films, injection molded parts and flexible pipes.

[031] Films, injection molded parts or flexible pipes comprising a propylene polymer composition according to any one of the preceding paragraphs [001] to [026].

The present invention will now be described in further detail by the examples provided below.

EXAMPLES

1. Definitions/Measuring Methods

The following definitions of terms and determination methods apply for the above general description of the invention as well as to the below examples unless otherwise defined.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load).

$MFR_2$ (190° C.) is measured according to ISO 1133 (190° C., 2.16 kg load).

Ethylene content, in particular of the matrix, i.e. polypropylene (A), is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 $cm^{-1}$ was measured with Perkin Elmer FTIR 1600 spectrometer. The method was calibrated by ethylene content data measured by $^{13}$C-NMR.

Content of any one of the C3 to C20 α-olefins is determined with $^{13}$C-NMR; literature: "IR-Spektroskopie für Anwender"; WILEY-VCH, 1997 and "Validierung in der Analytik", WILEY-VCH, 1997.

Content of any one of the C2 to C8 alkyl acrylates content, in particular butylacrylate (BA) content, is measured using FTIR by evaluating the height of the absorption peak at 1735 cm$^{-1}$.

Intrinsic viscosity is measured according to DIN ISO 1628/1, October 1999 (in Decalin at 135° C.).

Tensile Modulus is measured according to ISO 527-3 (cross head speed=50 mm/min; 23° C.) using injection molded specimens as described in EN ISO 1873-2 (dog bone shape, 4 mm thickness).

Tensile Strength is measured according to ISO 527-3 (cross head speed=50 mm/min; 23° C.) using injection molded specimens as described in EN ISO 1873-2 (dog bone shape, 4 mm thickness).

Flexural modulus is measured according to ISO 178.

The flexural modulus is measured on samples prepared from injection molded specimens as described in EN ISO 1873-2 (80×10×4 mm)

Charpy impact test: The charpy notched impact strength (Charpy NIS) is measured according to ISO 179 1 eA at 23° C. and −20° C., respectively. For the preparation of the injection molded test specimens and the compression molded test specimens see "flexural modulus".

The xylene solubles (XS, wt.-%): Content of Xylene solubles (XS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Amorphous Rubber Fraction of the Xylene Solubles (AM)—Determination of AM

The solution from the second 100 ml flask in the xylene solubles analysis is treated with 200 ml of acetone under vigorous stirring. The precipitate is filtered and dried in a vacuum oven at 90° C.

AM %=(100×$m_2$×$v_o$)/($m_o$×$v_1$)
$m_o$=initial polymer amount (g)
$m_2$=weight of precipitate (g)
$v_o$=initial volume (ml)
$v_1$=volume of analyzed sample (ml)

Strain Hardening Behavior (Melt Strength):

To characterize the extent of strain hardening of the polymer compositions in the present invention, the rheological properties of the treated and untreated polymers were tested on a standard Physica instrument in combination with a SER—Extensional Rheology System. The measurements were performed at 180° C. and at different Hencky strain rates. The method is described in details in M. Sentmanat et al, "Measuring the transient extensional rheology of polyethylene melts using the SER universal testing platform", J. Rheol. 49s3d, 585-606. In the present invention, following procedure is applied for carrying out the SER— Extensional experiments:

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature and cut to stripes of 0.7 mm thickness to a plate from which stripes of a width of 10 mm and a length of 18 mm are cut.

Check of the SER Device

Because of the low forces acting on samples stretched to thin thicknesses, any essential friction of the device would deteriorate the precision of the results and has to be avoided. In order to make sure that the friction of the device less than a threshold of 5×10$^{-3}$ mNm (Milli-Newtonmeter) which is required for precise and correct measurements, following check procedure is performed prior to each measurement:

The device is set to test temperature (180° C.) for minimum 30 minutes without sample in presence of the clamps A standard test with 0.3 s$^{-1}$ is performed with the device on test temperature (180° C.)

The torque (measured in mNm) is recorded and plotted against time

The torque must not exceed a value of 5×10$^{-3}$ mNm to make sure that the friction of the device is in an acceptably low range Conducting the Experiment The device is heated for min. 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes+/−20 seconds before the experiment is started. During the stretching experiment under inert atmosphere (nitrogen) at constant Hencky strain rate, the torque is recorded as function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must me wound up symmetrically on both drums, but also symmetrically in the upper and lower half of the specimen.

If symmetrical stretching is confirmed, the transient elongational viscosity is calculated from the recorded torque as described in M. Sentmanat et al, "Measuring the transient extensional rheology of polyethylene melts using the SER universal testing platform", J. Rheol. 49s3d, 585-606.

For the evaluation of the strain hardening, the value $SH_{3.0/2.5}$ is calculated as follow: $SH_{3.0/2.5}=(\log(\eta^e_{3.0})-\log(\eta^2_{2.5}))/(\log(3.0)-\log(2.5))$ where log is Brigg's logarithm, and $\eta^e_{3.0}$ and $\eta^e_{2.5}$ are the elongation viscosities at 3.0 and 2.5% strain respectively. The higher the $SH_{3.0/2.5}$ value, the higher the strain hardening.

Preparation of the Examples

The polypropylene composition CE1 (heterophasic propylene copolymer (E)) was produced in a multistage polymerization process consisting of a loop reactor and two gas phase reactors using a conventional Ziegler Natta catalyst system as known in the art. In the loop reactor, a propylene random copolymer with an ethylene content of 4.1 wt.-% and MFR of 1.80 g/10 min was produced. The polymer was transferred to the first gas phase reactor (the second reactor in total), where the ethylene content was adjust to 6.4 wt.-% and the MFR to 1.40 g/10 min. In this stage, the composition had an XS value of 21.7 wt.-%. Then the composition was transferred to the second gas phase reactor (the third reactor in total) as the last polymerization stage. The final composition had a MFR value of 0.80 g/10 min, a XS value of 38.5 wt.-% and the intrinsic viscosity of AM was 2.8 dl/g. The ethylene content of the xylene soluble part was 24.9 wt.-%. The total ethylene content in the entire composition was 14.3 wt.-%.

EBA copolymer 1 (an ethylene C2 to C8 alkyl acrylate copolymer (C)) is an ethylene-butyl acrylate copolymer with a butyl acrylate content of 17.0 wt-% and a density of 0.924 g/cm$^3$ and MFR$_2$ (190° C., 2.16 kg) of 1.50 g/10 min.

EBA copolymer 2 (an ethylene C2 to C8 alkyl acrylate copolymer (C)) is an ethylene-butyl acrylate copolymer with a butyl acrylate content of 27.0 wt-% and a density of 0.924 g/cm$^3$ and MFR$_2$ (190° C., 2.16 kg) of 4.00 g/10 min.

The preparation of comparative examples and CE2, CE3, CE4 and examples E1 and E2 was carried out by mixing of the components using the twin screw extruder and processing parameters described on page 23. The composition and properties of the examples and comparative examples are summarized in Table 1. 1,3 butadiene was used as bifunctionally unsaturated monomer and t-butyl peroxy isopropyl carbonate was used as free radical-forming agent.

TABLE 1

Modification of soft polypropylene in combination with adding ethylene alkyl-acrylate copolymers

| | Unit | CE 1 | CE 2 | CE 3 | CE 4 | E 1 | E 2 |
|---|---|---|---|---|---|---|---|
| CE 1 | wt-% | 100 | 99.4 | 80 | 80 | 79.4 | 79.4 |
| EBA copolymer 1 | wt-% | — | — | 20 | — | 20 | — |
| EBA copolymer 2 | wt-% | — | — | — | 20 | — | 20 |
| free radical-forming agent | wt-% | — | 0.3 | — | — | 0.3 | 0.3 |
| bifunctionally unsaturated monomer | wt-% | — | 0.3 | — | — | 0.3 | 0.3 |
| MFR Value | g/10 min | 0.8 | 2.6 | 1 | 0.9 | 1.7 | 1.6 |
| Gel content | wt.-% | 0.00 | 0.24 | 0.13 | 0.24 | 0.25 | 0.28 |
| Tensile Modulus | MPa | 235 | 230 | 243 | 224 | 163 | 152 |
| Tensile Strength | MPa | 18.6 | 16.7 | 9.2 | 8.7 | 15 | 16.1 |
| Impact strength at RT | kJ/m$^2$ | 82 | 76.6 | 79.2 | 71.7 | 68.9 | 65 |
| Impact strength at −20° C. | kJ/m$^2$ | 12 | 58.2 | 92.3 | 96.6 | 89.7 | 105.2 |
| SH$_{3.0/2.5}$ at Hencky strain rate of 10 s$^{-1}$ | | | | | 0.463 | | 0.876 |
| SH$_{3.0/2.5}$ at Hencky strain rate of 3 s$^{-1}$ | | | | | 0.431 | | 1.03 |
| SH$_{3.0/2.5}$ at Hencky strain rate of 1 s$^{-1}$ | | | | | 0.395 | | 0.398 |
| SH$_{3.0/2.5}$ at Hencky strain rate of 0.3 s$^{-1}$ | | | | | 0.621 | | 0.639 |

We claim:

1. Propylene polymer composition comprising:
   (a) at least 74.0 to 86.0 wt. % of an heterophasic propylene copolymer based on the total amount of propylene polymer composition comprising
      (i) 50.0 to 70.0 wt-% of a polypropylene copolymer based on the total amount of the heterophasic propylene copolymer, wherein the polypropylene copolymer is a copolymer of propylene and an amount of 1.0 to not more than 8.0 wt.-% of a comonomer selected from the group consisting of ethylene, C4 α-olefin, C6 α-olefin, C7 α-olefin, C8 α-olefin C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof, and
      (ii) 30.0 to 50.0 wt.-% of an elastomeric copolymer based on the total amount of the heterophasic propylene copolymer, said elastomeric copolymer being an elastomeric copolymer of ethylene and in an amount of 60-80wt.-%, of at least one α-olefin comonomer selected from the group consisting of propylene, 1-butene, 1-pentene, 1-hexene, 1-heptene and 1-octene, and wherein the heterophasic propylene copolymer has a melt flow rate of 0.4-1.0 g/10 min
   (b) 10 to 30 wt.-% based on the total amount of propylene polymer composition of an ethylene C2 to C8 alkyl acrylate copolymer, having 17-27 wt.-% of C2-C8 acrylate and an MFR of 1.5 to 4.0 g/10 min, and
   (c) 0.1 to 5.0 wt.-% of units derived from at least bifunctionally unsaturated monomer(s) and/or at least multifunctionally unsaturated low molecular weight polymer(s) based on the total amount of propylene polymer composition, aid bifunctionally unsaturated monomer(s) being selected from the group consisting of divinylaniline, divinylpentane, divinylpropane, allyl acrylate, allyl methacrylate, allyl methyl maleate allyl vinyl ether, 1,3-butadiene, chloroprene, cyclohexadiene, cyclopentadiene, 2,3-dimethylbutadiene, heptadiene, hexadiene, isoprene and 1,4-pentadiene, aliphatic bis(maleimide), aromatic and/or aliphatic bis(citraconimide) and mixtures of those unsaturated monomers, and said at least multifunctionally unsaturated low molecular weight polymer having M$_n$≤10,000 g/mol and being a polybutadiene having more than 50% of the butadiene in the 1,2 vinyl configuration, wherein
   the propylene polymer composition has a gel content determined as the xylene hot insoluble fraction content of at least 0.25 wt.-% to equal or below 1.00 wt.-%;
   wherein said propylene polymer composition has a tensile modulus of 152 to below 200 MPa measured according to ISO 527-3 (cross head speed=50 mm/min);
   a strain hardening SH$_{3.0/2.5}$ (at a Hencky strain rate of 3 s$^{-1}$) of at least 0.5-1.03; and;
   high impact strength of at least 80 to 105.2 kJ/m$^2$ at −20° C.

2. Propylene polymer composition according to claim 1, wherein the polypropylene copolymer is the matrix of said heterophasic propylene copolymer and the elastomeric copolymer is the amorphous part of said heterophasic propylene copolymer.

3. Propylene polymer according to claim 1, wherein the comonomer of the polypropylene copolymer is ethylene.

4. Propylene polymer composition according to claim 1, wherein the polypropylene copolymer is bimodal.

5. Propylene polymer composition according to claim 1, wherein the elastomeric copolymer is an ethylene propylene rubber (EPR).

6. Propylene polymer composition according to claim 1, wherein the intrinsic viscosity of the elastomeric copolymer, determined as the intrinsic viscosity of the acetone precipitated fraction of the xylene soluble fraction, IV of AM, is in the range of 1.0 to 4.0 dl/g.

7. Propylene polymer composition according to claim 1, wherein:
the comonomer of the polypropylene copolymer is selected from the group consisting of ethylene and C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, and mixtures thereof, and,
the comonomer of the elastomeric copolymer if selected from the group consisting of propylene, 1-butene, 1-pentene, 1-hexene, 1-heptene, and mixtures thereof.

8. Propylene polymer composition according to claim 1, wherein the C2 to C8 alkyl of the ethylene C2 to C8 alkyl acrylate copolymer is selected from the group consisting of methyl, ethyl, and butyl.

9. Propylene polymer composition according to claim 1, wherein the ethylene C2 to C8 alkyl acrylate copolymer is ethylene butyl-acrylate (EBA).

10. Propylene polymer composition according to claim 1, wherein the bifunctionally unsaturated monomers used for the units are selected from the group consisting of divinyl compounds, allyl compounds and dienes.

11. Propylene polymer composition according to claim 1, wherein the composition has an $MFR_2$ (230° C.) measured according to ISO 1133 of not more than 5.00 g/10 min.

12. Propylene polymer composition according to claim 1 used in the manufacture of films, injection molded parts and flexible pipes.

13. Process for the manufacture of a propylene polymer composition comprising:
providing a heterophasic mixture of a polypropylene copolymer
and an elastomeric copolymer of ethylene and at least one α-olefin comonomer selected form the group consisting of propylene, 1-butene, 1-pentene, 1-hexene, 1-heptene and 1-octene,
providing an ethylene C2 to C8 alkyl acrylate copolymer, and further comprising the steps of:
(a) mixing the heterophasic mixture of polypropylene copolymer and elastomeric copolymer and said ethylene C2 to C8 alkyl acrylate copolymer,
(b) adding bifunctionally unsaturated and/or multifunctionally unsaturated compounds, and
(c) extruding said mixture
wherein the propylene polymer composition comprises:
(α) at least 74.0 to 86.0 wt.-% of an heterophasic propylene copolymer based on the total amount of propylene polymer composition comprising
(i) 50.0 to 70.0 wt.-% of a polypropylene copolymer based on the total amount of the heterophasic propylene copolymer, wherein the polypropylene copolymer is a copolymer of propylene and an amount of 1.0 to not more than 8.0 wt.-% of a comonomer selected from the group consisting of ethylene, C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof, and
(ii) 30.0 to 50.0 wt.-% of an elastomeric copolymer based on the total amount of the heterophasic propylene copolymer, said elastomeric copolymer being an elastomeric copolymer of ethylene and in an amount of 60-80 wt.-% of at least one α-olefin comonomer selected from the group consisting of propylene, 1-butene, 1-pentene, 1-hexene, 1-heptene and 1-octene, and wherein the heterophasic propylene copolymer has a melt flow rate of 0.4 to 1.0 g/10 min, and
(β) 10 to 30 wt.-% based on the total amount of propylene polymer composition of an ethylene C2 to C8 alkyl acrylate copolymer, having 17-27 wt.-% C2-C8 acrylate and an MFR of 1.5 to 4.0 g/10 min, and
(γ) 0.1 to 5.0 wt.-% of units derived from at least bifunctionally unsaturated monomer(s) and/or at least multifunctionally unsaturated low molecular weight polymer(s) based on the total amount of propylene polymer composition, said bifunctionally unsaturated monomer(s) being selected from the group consisting of divinylaniline, divinylpentane, divinylpropane, allyl acrylate, allyl methacrylate, allyl methyl maleate, allyl vinyl ether, 1,3-butadiene, chloroprene, cyclohexadiene, cyclopentadiene, 2,3-dimethylbutadiene, heptadiene, hexadiene, isoprene and 1,4-pentadiene, aliphatic bis(maleimide), aromatic and/or aliphatic bis(citraconimide) and mixtures of thaw unsaturated monomers, and said at least multifunctionally unsaturated low molecular weight polymer having $M_n \leq 10,000$ g/mol mol and being a polybutadiene having more than 50% of the butadiene in the 1,2 vinyl configuration,
wherein the propylene polymer composition has a gel determined as the xylene hot insoluble fraction content of at least 0.25 wt.-% to equal or below 1.00 wt.-%,
wherein the propylene polymer composition has a tensile modulus of 152 to below 200 MPa measured according to ISO 527-3 (cross head speed=50 mm/min);
a strain hardening $SH_{3.0/2.5}$ (at a Hencky strain rate of 3 s$^{-1}$) of at least 0.5-1.03; and;
high impact strength of at least 80-105.2 kJ/m$^2$ at $-20°$ C.

14. Process according to claim 13, wherein said heterophasic mixture of the polypropylene copolymer and the elastomeric copolymer is produced by the steps comprising:
(a) polymerizing propylene and further comonomer(s) in at least one reactor to obtain the polypropylene copolymer, and
(b) transferring said polypropylene copolymer in a further reactor, producing an elastomeric copolymer by polymerizing propylene and further comonomer(s) in the presence said polypropylene copolymer to obtain the heterophasic mixture.

15. Process according to claim 13, wherein step (b) is carried out by using at least bifunctionally unsaturated monomer(s) and a thermally decomposing free radical-forming agent.

16. Process according to claim 13, wherein said heterophasic mixture of polypropylene and elastomeric copolymer is produced by comprising the steps (a) polymerizing propylene and further comonomer(s) in a loop reactor followed by a gas phase reactor, to obtain the polypropylene copolymer, and
(b) transferring said polypropylene copolymer in a further gas phase reactor,
(c) producing an elastomeric copolymer by polymerizing propylene and further comonomer(s) in the presence said polypropylene copolymer to obtain the heterophasic mixture.

17. Films, injection molded parts of flexible pipes comprising a propylene composition comprising:
   (a) at least 74.0 to 88.0 wt.-% of an heterophasic propylene copolymer based on the tot amount of propylene polymer composition comprising
      (i) 50.0 to 70.0 wt.-% of a polypropylene copolymer based on the total amount of the heterophasic propylene copolymer, wherein the polypropylene copolymer is a copolymer of propylene and an amount of 1.0 to not more than 8.0 wt.-% of a comonomer selected from the group consisting of ethylene, C4 α-olefin, C5 α-olefin, C6 α-olefin, C7 α-olefin, C8 α-olefin, C9 α-olefin, C10 α-olefin, C11 α-olefin, C12 α-olefin, C13 α-olefin, C14 α-olefin, C15 α-olefin, C16 α-olefin, C17 α-olefin, C18 α-olefin, C19 α-olefin, C20 α-olefin and mixtures thereof, and
      (ii) 30.0 to 50.0 wt.-% of an elastomeric copolymer based on the total amount of the heterophasic propylene copolymer, said elastomeric copolymer being an elastomeric copolymer of ethylene and in an amount of 60-80 wt.-% of at least α-olefin comonomer selected from the group consisting of propylene, 1-butene, 1-pentene, 1-hexene, 1-heptene and 1-octene, and wherein the heterophasic propylene copolymer has a melt flow rate of 0.4-1.0 g/10, and
   (b) 10 to 30 wt.-% based on the total amount of propylene polymer composition of an ethylene C2 to C8 alkyl acrylate copolymer, having 17-27 wt.-% of C2-C8 acrylate and an MFR of 1.5 to 4.0 g/10 min, and
   (c) 0.1 to 5.0 wt.-% of units derived from at least bifunctionally unsaturated monomer(s) and/or at least multifunctionally unsaturated low molecular weight polymer (s) based on the total amount of propylene polymer composition, said bifunctionally unsaturated monomer (s) being selected from the group consisting of divinylaniline, divinylpentane, divinylpropane, allyl acrylate, allyl methacrylate, allyl methyl maleate, allyl vinyl ether, 1,3-butadiene, chloroprene, cyclohexadiene, cyclopentadiene, 2,3-dimethylbutadiene, heptadiene, hexadiene, isoprene and 1,4-pentadiene, aliphatic bis (maleimide), aromatic and/or aliphatic bis(citraconimide) and mixtures of these unsaturated monomers, and said at least multifunctionally unsaturated low molecular weight polymer having $M_n \leq 10,000$ g/mol and being a polybutadiene having more than 50% of the butadiene in the 1,2 vinyl configuration
   wherein the propylene polymer composition has a gel content of at least 0.25 wt.-% to equal or below 1.00 wt.-% determined as the xylene hot insoluble fraction,
   wherein the propylene polymer composition has a tensile modulus of 152 to below 200 MPa measured according to ISO 527-3 (cross head speed=50 mm/min);
a strain hardening $SH_{3.0/2.5}$ (at a Hencky strain rate of 3 s$^{-1}$) of at least 0.5-1.03; and;
high impact strength of at least 60-105.2 kJ/m$^2$ at −20° C.

* * * * *